May 28, 1940. G. M. SACERDOTE 2,202,320
COOKING SET
Filed April 15, 1936  6 Sheets-Sheet 1
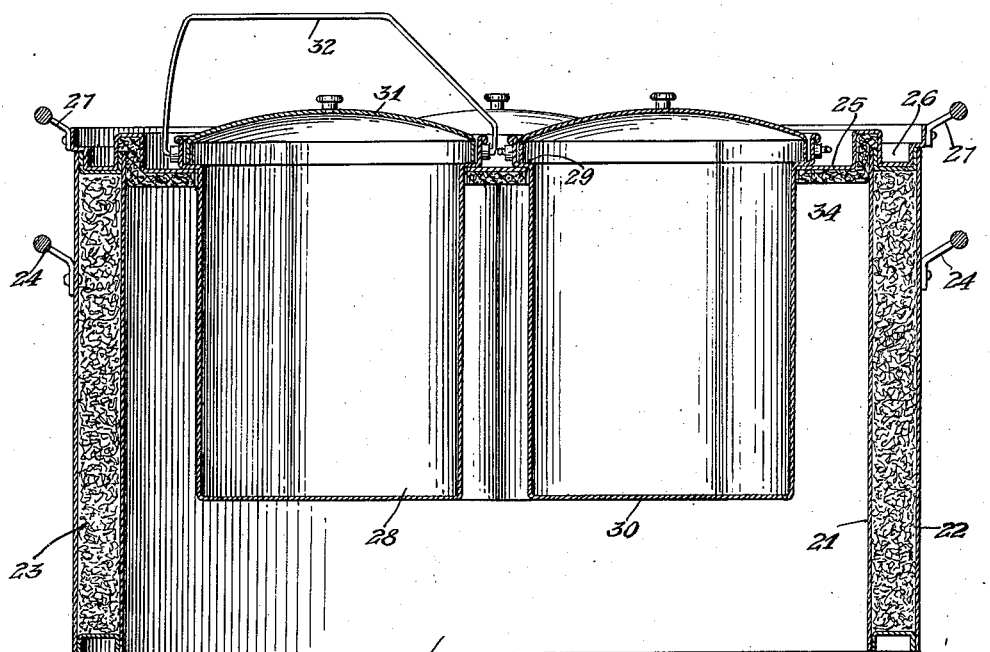
Fig:1
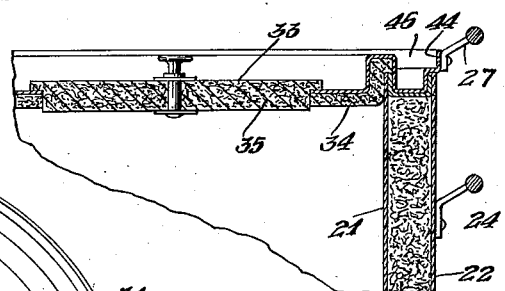
Fig:3
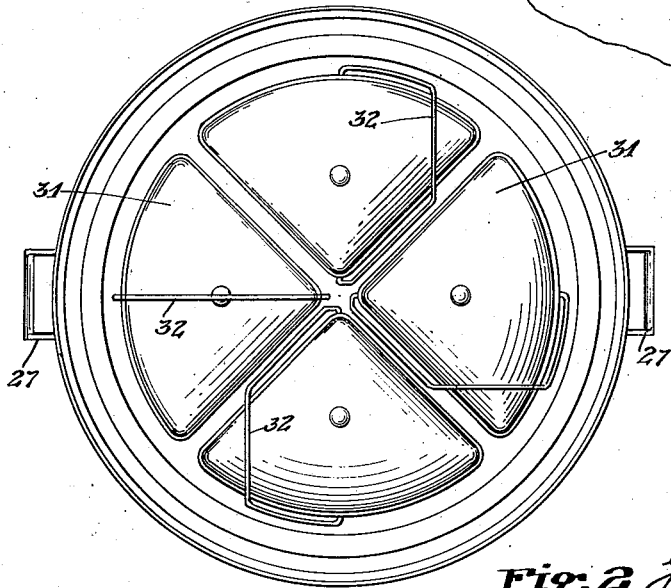
Fig:2
INVENTOR.

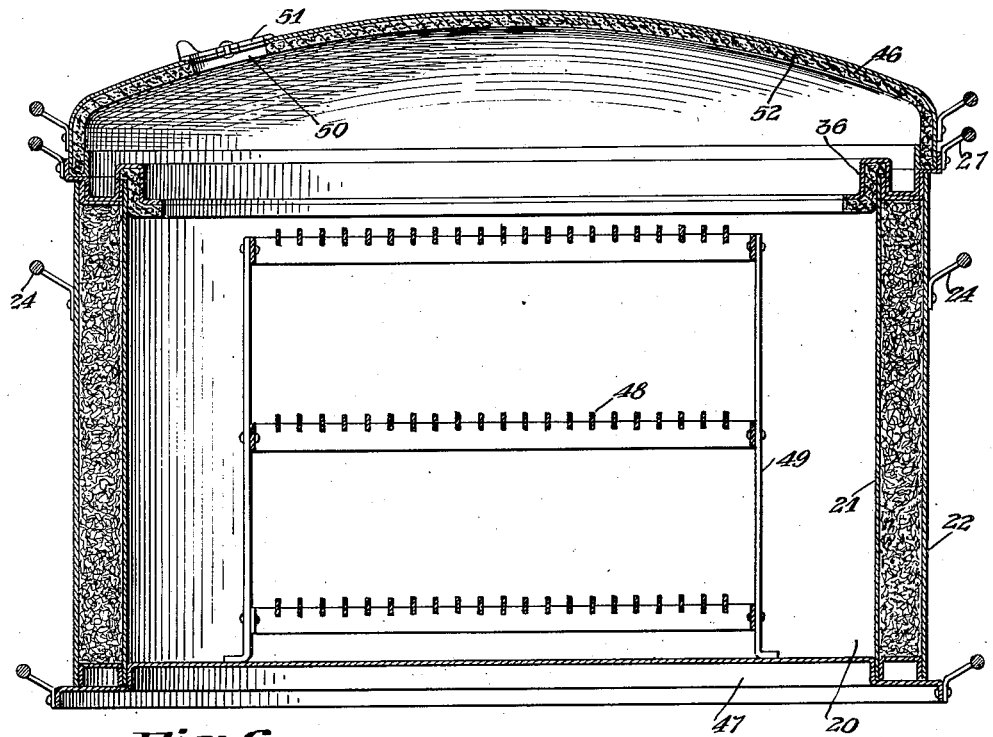
Fig: 6
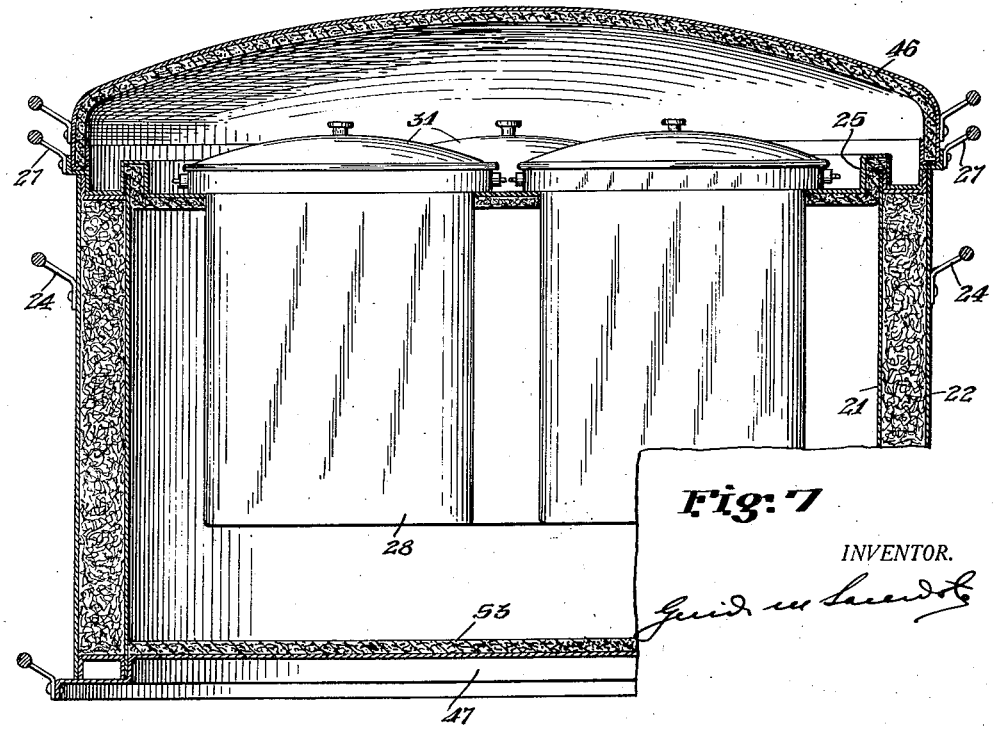
Fig: 7
INVENTOR.

INVENTOR.

May 28, 1940. G. M. SACERDOTE 2,202,320
COOKING SET
Filed April 15, 1936 6 Sheets-Sheet 5
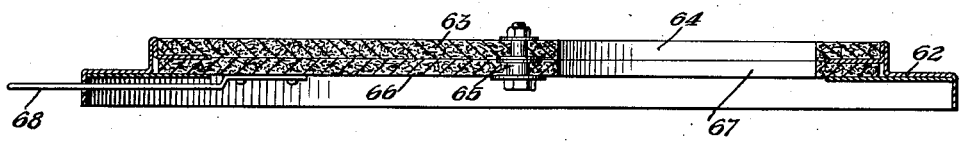
Fig. 13
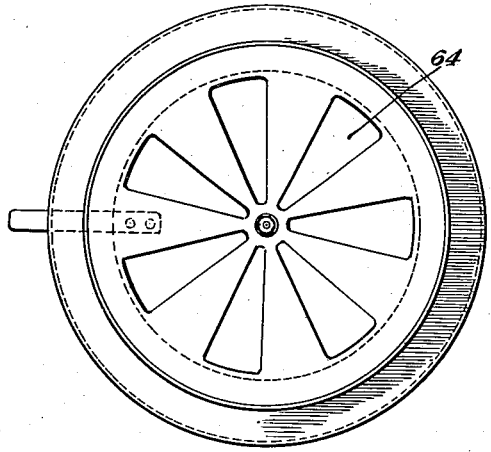
Fig. 14
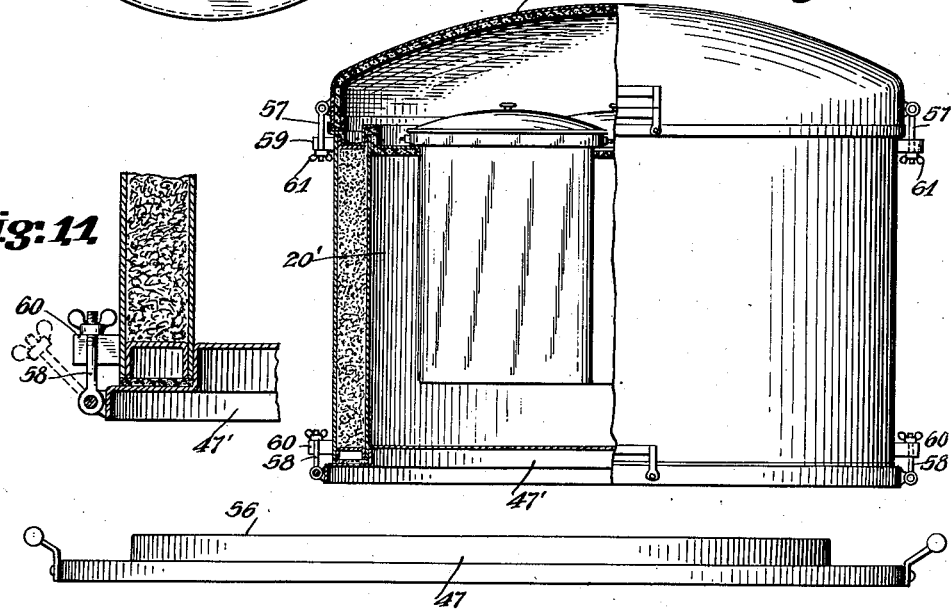
Fig. 10
Fig. 11
Fig. 9
INVENTOR.

May 28, 1940.  G. M. SACERDOTE  2,202,320
COOKING SET
Filed April 15, 1936   6 Sheets-Sheet 6

INVENTOR

Patented May 28, 1940

2,202,320

UNITED STATES PATENT OFFICE 2,202,320

COOKING SET

Guido M. Sacerdote, Bayside, N. Y.

Application April 15, 1936, Serial No. 74,465

6 Claims. (Cl. 53—11)

This invention relates to cooking appliances and more particularly refers to improvements in cooking sets of the type comprising a plurality of elements adapted to be combined with one another, in order to produce cooking devices of different character.

The primary object of my invention is to provide a cooking set composed of a plurality of elements adapted to be arranged to form different combinations, suitable for various types of cooking, this set being especially advantageous for use where only a limited space or a limited number of burners is available.

Another object is to provide a novel and improved arrangement of cooking device whereby one or more pots can be conveniently suspended within a shell, adapted to be placed over a single burner, so that the heat from the flame of a single burner can be used for simultaneously cooking various kinds of foods.

A further object is to provide a device of the character specified, in which the shell is well adapted for the full utilization of the heat of the flame and in which said shell can also be used, together with other elements of the set, to form an oven adapted for baking or roasting purposes.

Other objects and advantages of the present invention will more fully appear as the description proceeds and will be set forth and claimed in the appended claims.

My invention is illustrated by way of example in the accompanying drawings, in which:

Fig. 1 is a vertical section of an arrangement of the vertical shell and other parts of my improved cooking set, making it possible to suspend a plurality of pots within said shell, the shell being adapted to be placed over a burner of an ordinary cooking stove;

Fig. 2 is a plan view thereof;

Fig. 3 is a fragmentary vertical section of the same, showing how an individual cover may be used whenever one of the places reserved for the pots forming the cluster of pots is vacant;

Fig. 6 is a vertical section illustrating a still different arrangement, in which the shell is placed over a base plate and is provided with a closed top, thus forming an oven structure adapted for baking purposes;

Fig. 7 is a fragmentary vertical section of the arrangement, such as shown in Fig. 1, in which the shell is placed over a base plate and is provided with a closed top so as to form a fireless cooker;

Fig. 8 is a vertical section of an arrangement comprising only the base plate and the closed top, shown in Fig. 6, the two together forming a relatively shallow oven adapted for baking small cakes, potatoes, and the like;

Fig. 9 is a side view in elevation of the base plate shown in Figs. 6 and 8, said base plate being adapted to be used as a griddle independently of the other parts;

Fig. 10 is a side view in elevation, partly broken away and sectioned, of an arrangement similar to that shown in Fig. 7, minus the base insulating pad, in which the various parts are provided with means for securely locking one part to another, the resulting device being adapted for use as a pressure cooker;

Fig. 11 is a fragmentary vertical section in an enlarged scale, illustrating the locking means employed in the arrangement of Fig. 10;

Figure 12:
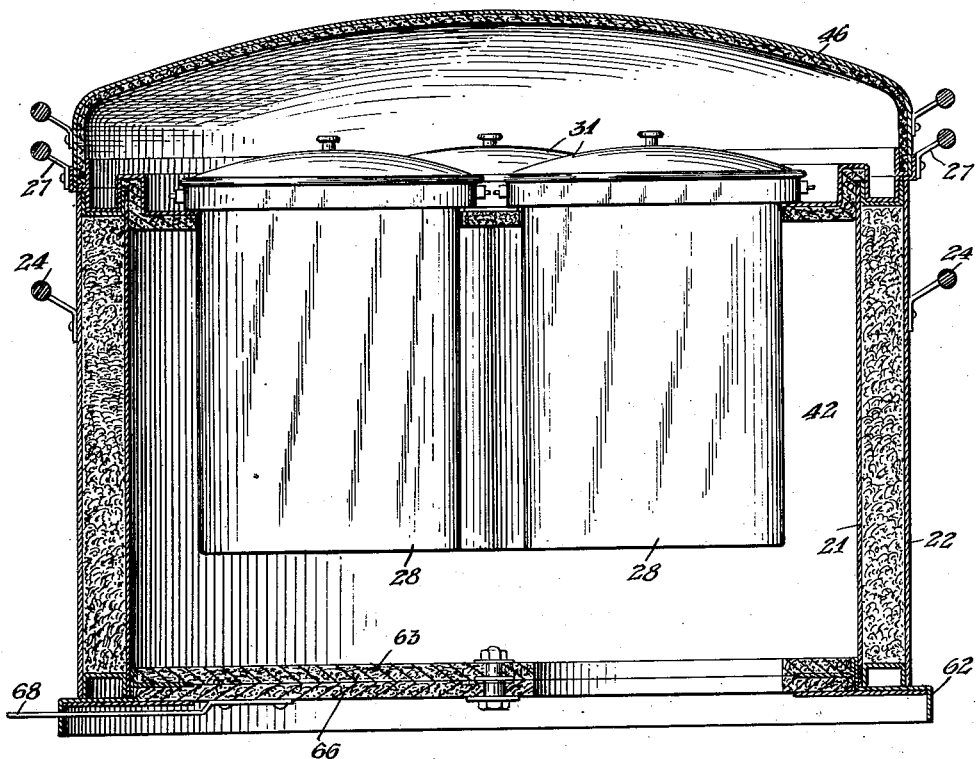
Figure 17:
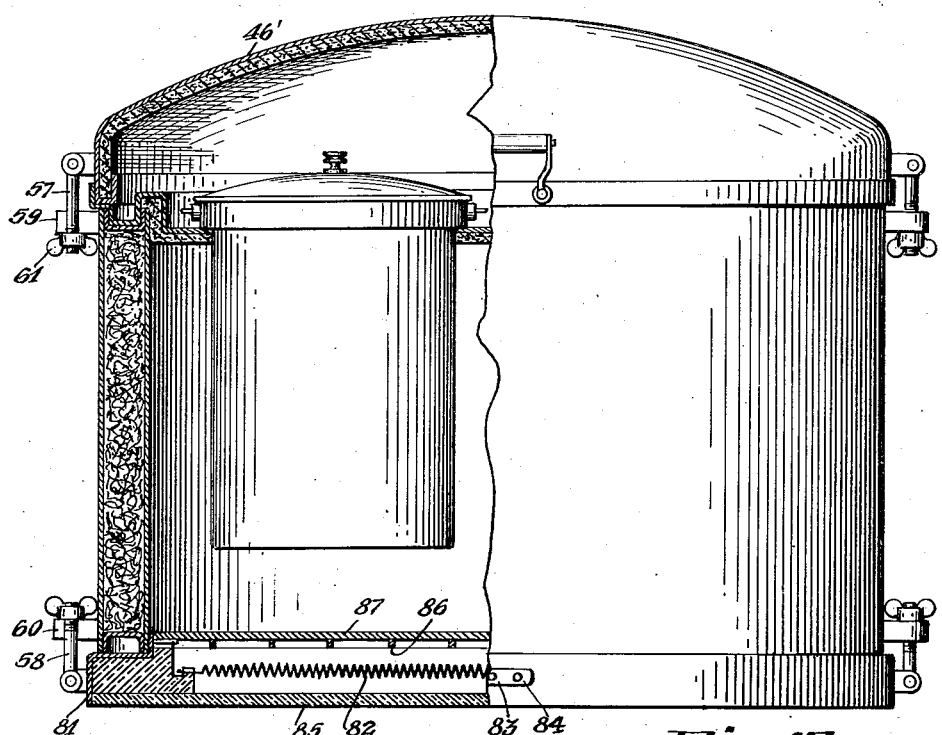
Figure 15:
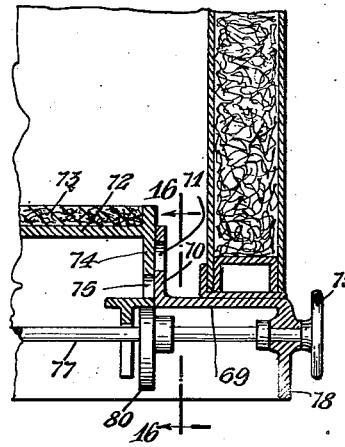
Figure 16:
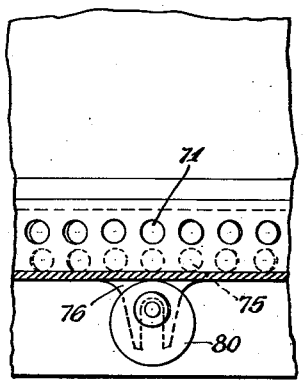

Fig. 12 is a vertical section of an arrangement similar to that shown in Fig. 7, in which the base plate is composed of a fixed and a movable part, together adapted to form a register-like device, adapted to allow the direct heat of the flame to reach, or prevent it from reaching, the inside of the shell; the device being thus adapted for use first as a cooker by direct heat, and then as a fireless cooker;

Fig. 13 is a vertical section of the base plate shown in Fig. 12;

Fig. 14 is a plan view thereof in a smaller scale;

Fig. 15 is a fragmentary vertical section of the lower part of a device, such as shown in Fig. 12, illustrating a different type of adjustable base plate;

Fig. 16 is a fragmentary side view in elevation of said base plate taken on line 16—16 of Fig. 15; and Fig. 17 is a view similar to Fig. 10 in which the base plate is provided with electric heating elements.

In the description and drawings wherever the same element is used in different combinations, it is identified by the same reference character.

Referring to Figs. 1, 2, 3, 20 designates a preferably cylindrical shell, adapted to be placed over an ordinary stove burner, said shell being open at both top and bottom and being preferably composed of an inner shell 21 and an outer shell 22, forming an annular chamber adapted to be filled with thermal insulating material 23. Said shell is also provided with two handles 24, to facilitate handling. On the upper part of the shell is placed a top 25, the rim portion, 26, of which is adapted to exactly register with the upper part of the shell, said top being provided with handles 27, for handling.

The top is shown formed with a circumferential series of four segmental openings, within which can be inserted various pots 28, having a corresponding sectional outline.

At the upper end the pots are shown formed with a shoulder 29, which will rest on top 25, so that the pots remain suspended within the shell, preferably with their bottom 30 at a level higher than the lower end of the shell. The pots are also preferably provided with removable individual covers 31 and with handles 32.

It will be seen that by virtue of this arrangement when the shell is placed directly over a burner of an ordinary cooking stove, the heat of the flame will be applied directly against the bottom of the pots 28 and, furthermore, said heat will be retained within the space surrounding said pots so that after a while the flame can be lowered to a point just sufficient to maintain the required temperature within the shell.

The arrangement, therefore, presents two outstanding advantages; namely, it makes it possible to simultaneously cook a variety of foods over a single burner and it makes it possible to use heat with a maximum of efficiency.

When food is to be cooked only in some of the pots, the remaining pot, or pots, can be filled with water, if needed, or else they can be removed and a temporary cover, or covers, such as shown at 33 in Fig. 3, can be used instead to close the corresponding openings in order to prevent the escape of heat.

Both the top 25 and covers 33 are preferably heat insulated, as shown at 34, 35, in order to increase the heat efficiency of the device.

Figure 4:
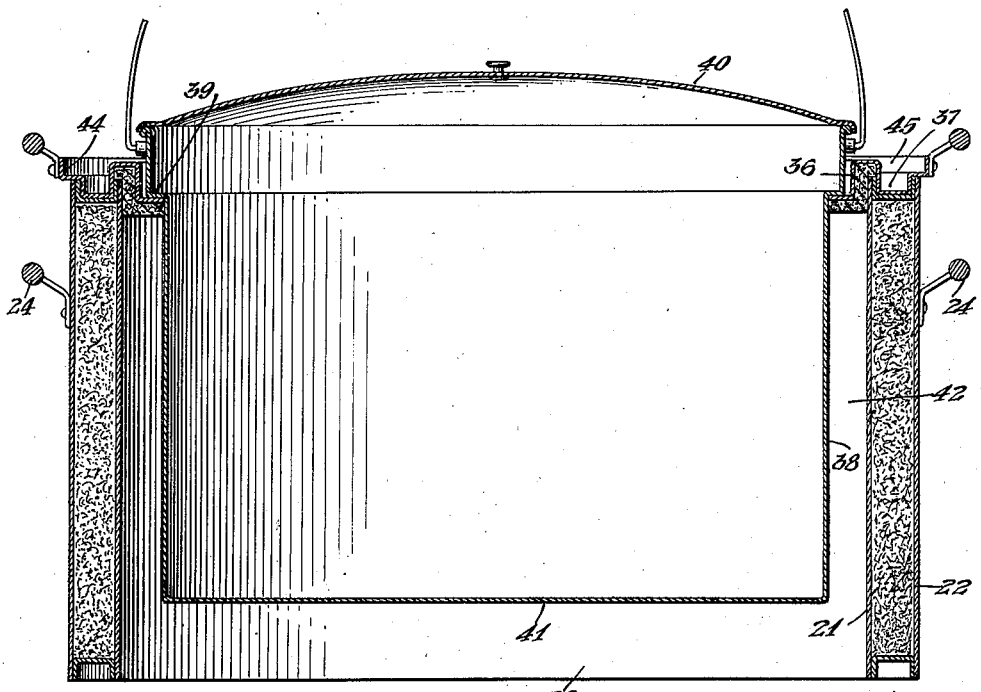
Fig. 4 is a vertical section of the same shell, combined with a different top, interchangeable with the top illustrated in Figs. 1 and 3, adapted to receive a single large pot.

In the arrangement of Fig. 4 top 25 has been removed and in its stead another top, 36, has been substituted, provided with a rim portion 37, also adapted to exactly register with the top of the shell 20.

The difference between top 36 and top 25 is that top 36 is provided with a single large opening, adapted to receive a single large pot 38, the upper part of which is formed with a supporting shoulder 39, and is preferably provided with a removable cover 40. Pot 38 is thus suspended within the shell, its bottom 41 remaining at a level somewhat higher than the lower end of the shell and its diameter being smaller than the inner diameter of the shell, so as to form therewith an annular chamber 42, causing the heat to entirely surround the body of the pot.

Figure 5:
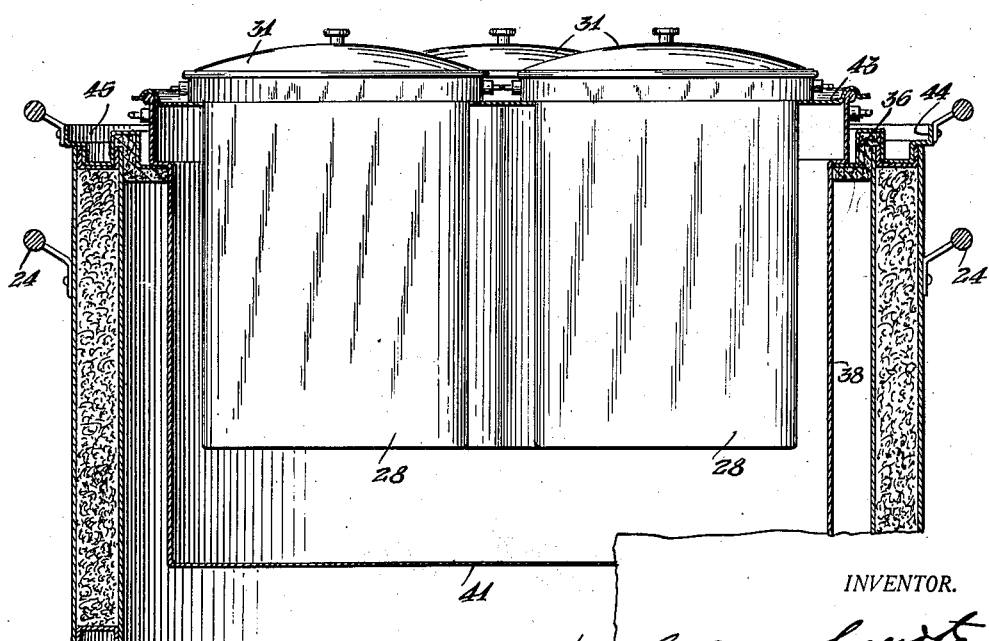
Fig. 5 is a fragmentary vertical section of the arrangement shown in Fig. 4, in which the pot is equipped with an auxiliary top, adapted to receive a cluster of smaller pots, the arrangement making it possible to use the device as a double boiler.

The arrangement shown in Fig. 4 can be changed into the double boiler arrangement shown in Fig. 5, by providing a removable top 43 for the pot 38, said top 43 being provided with one or more openings adapted to receive a pot, or pots, which will be held suspended within the large pot 38. The drawing shows the top 43 as being provided with four segmental openings, arranged in circumferential series, adapted to receive the pots 28, shown in Fig. 1, but, of course, it will be understood that another top, interchangeable with top 43 could be used, adapted to receive a single pot, somewhat smaller than pot 38, if desired.

The resulting arrangement can be used as a double boiler for cooking foods such as oatmeal, cake frosting, etc. which should only be subjected to the even temperature of boiling water, pot 38 being used for heating the water surrounding the other pot or pots 28, in which the food or foods to be cooked will be placed.

The rim portion of both top 25 and top 36 is shown as being provided with a vertically extending flange 44, forming an abutment 45, within which can be placed the lower end of a closed top, such as shown at 46 in Figs. 6, 7, 8, and 12. If either top 25 or 36 is placed on top of the shell with the pots 28 or 38 removed, and closed top 46 is placed in position over the rim of top 25 or 36, the resulting structure can form an oven adapted for baking cakes and the like if the shell is placed over a base plate 47, as shown in Fig. 6.

In this case the base plate is placed directly over the burner and the articles to be baked are placed within the oven, either directly over the base plate or else on grates, such as shown at 48, which may be placed in tiers supported by stands 49 resting on the base plate.

The top 46 is preferably provided with a vent 50, which may be controlled by a damper 51 for regulating the heat within the oven. The top 46 is also preferably heat insulated as shown at 52.

In Fig. 7 I illustrate a similar arrangement in which top 25 has been substituted for top 36 and the pots 28 have been inserted within the openings provided in top 25. The base plate 47 is shown provided with a removable insulating pad 53. This arrangement can be used first by placing the shell and other parts supported thereby directly over the burner and after a while, when the cooking has been started, lifting the shell by means of its handles 24 and placing underneath it the base plate 47 together with the insulating pad 53.

The device will then have been converted into a fireless cooker which will continue to cook the foods contained within pots 28 by virtue of the heat stored within the closed chamber formed by shell 20 and top 25, and closed top 46.

Figure 8:
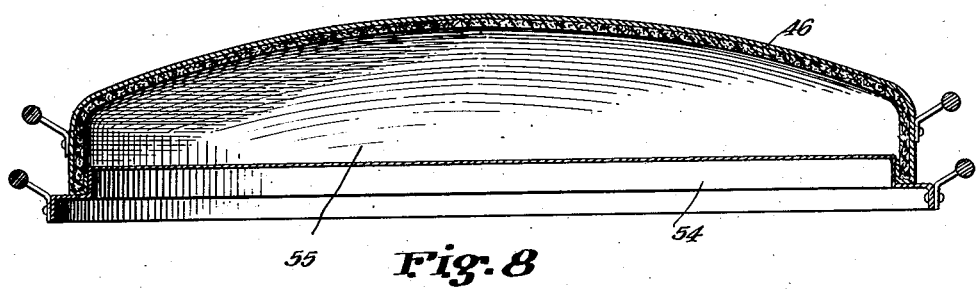

Closed top 46 can also be made to register with a base plate 54, similar to base plate 47, so as to form therewith a relatively shallow oven 55, as shown in Fig. 8, said oven being adapted for baking small cakes and the like, and naturally requiring less heat than the oven shown in Fig. 6, in order to reach the required baking temperature.

The base plate 47 is also illustrated in Fig. 9, which shows that the plate is formed with a perfectly flat and smooth top 56, adapted for cooking griddle cake and similar foods.

An arrangement such as shown in Fig. 7, minus the insulating pad 53, can also be used as a pressure cooker, as shown in Fig. 10, if the base plate 47' and the closed top 46' are provided with means for securely locking them onto the shell 20', so as to form an airtight chamber therewith. By way of example the closed top 46' and the base plate 47' are shown provided respectively with hinge bolts 57, 58, adapted to be inserted in slotted lugs 59, 60, outwardly projecting from the shell 20' and to be clamped thereto by means of wing nuts 61, in a well-known manner.

The resulting assembly can be placed directly over a burner and the steam issuing from the foods will be prevented from leaving the chamber. After a while the flame is cut off and the cooking operation will continue due to the heat stored within the chamber while the loss of aroma and volatile matters contained in the foods will be prevented.

When the arrangement is to be used as a fireless cooker, after the fashion shown in Fig. 7, it is preferable to avoid the necessity of lifting the shell and the pots supported therein in order to insert the base plate underneath it. I, therefore, prefer to use a base plate adapted to first allow the direct heat of the flame to reach the inside of the shell and then to prevent its escape from the shell chamber.

In Figs. 12, 13, 14, I illustrate such a base plate, which consists of a supporting frame 62, carrying a fixed disk 63, preferably made of heat insulating material, said disk being provided with a circumferential series of segmental openings 64. At the center said disk is equipped with a downwardly extending stud 65, on which is rotatably mounted another disk 66, provided with a circumferential series of segmental openings 67, adapted to register with openings 64, or to be angularly displaced therebetween by turning disk 66 by means of handle 68.

In the position shown in the drawings, openings 67 are shown in register with openings 64 so that the direct heat of the flame can reach the inside of the chamber within the shell. The cooking operation can thus be started. After a while, when the cooking operation is sufficiently advanced and heat has been collected within the chamber, disk 66 is angularly displaced by means of handle 68 so as to close openings 64, the flame is turned off and the device will then continue to act as a fireless cooker.

Another arrangement of base plate adapted to be used for the same purpose is shown in Figs. 15 and 16. In the same it will be seen that the base plate comprises a supporting frame 69, having a circumferential vertically extending flange 70, provided with openings 71, near its upper edge. Within said flange is vertically movable a plate member 72, preferably formed with a top depression in which can be inserted an insulating pad 73. Said plate 72 is formed with a downwardly extending circumferential flange 74, registering with the inner surface of flange 70, said flange 74 being provided with a circumferential series of openings 75 in proximity of its lower edge.

Said flange 74 is also provided with two diametrically opposite slotted lugs 76, through which passes a shaft 77, rotatably mounted in the vertical base ring 78 of plate 69, said shaft being operable by means of a knob or handwheel 79.

Said shaft 77 carries two cams 80, on which, due to gravity, rests plate 72 together with its flange 74. When the cams are in the position shown, the plate 72 occupies its lowermost position where the outer surface of flange 74 forms a continuous closure for openings 71 and the inner surface of flange 70 forms a continuous closure for openings 75. When shaft 77 is turned 180° from the position shown cams 80 will raise plate 72 to its uppermost position where openings 75 of its flange 74 will register with openings 71 of flange 70.

In this position the heat of the flame directed against the bottom of plate 72 will be deflected to the inside of the chamber within the shell through the openings and the cooking operation can be started. At the proper time shaft 77 can be turned to the position shown where plate 72 will fall of its own accord, closing the heat passages, the flame can be turned off and the heat will continue to operate as a fireless cooker.

It is obvious that, if desired, the closed top 46 can be made so as to be directly insertable over the top of the shell and its inner diameter can be such as to make it unnecessary to provide a special base plate for forming the shallow oven combination shown in Fig. 8; or else, the base plate shown in Figs. 6, 7, 9, can be used in connection with closed top 46 in order to form the combination shown in Fig. 8, since it is not necessary for the raised portion of the base plate to exactly register with the base of the closed top in order to form an effective oven structure.

The various combinations of elements described forming cooking devices adapted for different purposes can be made entirely self-contained, including a source of heat for electric operation, by providing one of the elements forming the heat chamber, preferably the base plate, with electric heating elements.

For instance, in Fig. 17, I show an arrangement similar to that illustrated in Fig. 10 where the base plate 81 is provided with heating elements such as 82, adapted to be connected to an electric circuit by means of terminals 83, 84, in a well-known manner. The base plate is preferably provided with a bottom 85 made of heat insulating material and with a grate 86 above the electric heating elements for protection. In order to use the base plate as a griddle a removable plate 87 can be placed directly over the grate 86, as shown.

The various constructional details may vary from those shown without departing from the inventive idea. The drawings, therefore, should be understood as being intended for illustrative purposes only and not in a limiting sense. I accordingly reserve the right to carry my invention into practice in all those ways and manners which may enter, fairly, into the scope of the appended claims.

I claim:

1. A sectionalized cooking appliance, comprising an open top and bottom shell, a removable top therefor, and a removable base plate adapted to complete an oven structure with said shell and top, said base plate having openings, and register means for controlling said openings, said shell and base plate having interengaging portions to form a substantially sealed joint therebetween, said base plate also having handles affixed thereto.

2. A sectionalized cooking appliance, comprising a shell forming a tubular section open all through from top to bottom, a removable top covering therefor having one or more openings, pots having their body portion adapted to register with and to be inserted through said openings, to project within said shell, a removable top for said shell and a removable base plate adapted to complete an oven with said shell and top, said shell and base plate having interengaging portions to form a substantially sealed joint therebetween, the lower surface of both said shell and base plate being free from downward projections so as to be adapted to rest on a flat surface substantially along the entire periphery of said lower surface, said base plate also having handles affixed thereto.

3. A sectionalized cooking appliance, comprising an open top and bottom shell, a removable top covering therefor having one or more openings, pots having their body portion adapted to register with and to be inserted through said openings, to project within said shell, a removable top for said shell and a removable base plate adapted to complete an oven structure with said shell and top, said base plate having openings, and register means for controlling said openings, said shell and base plate having interengaging portions to form a substantially sealed joint therebetween, said base plate also having handles affixed thereto.

4. A sectionalized cooking appliance, comprising an open top and bottom shell, a removable top covering therefor having one or more openings, pots having their body portion adapted to register with and to be inserted through said openings, to project within said shell, and a removable base plate for said shell, said base plate having openings, and register means for controlling said openings, said shell and base plate having interengaging portions to form a substantially sealed joint therebetween, said base plate also having handles affixed thereto.

5. A sectionalized cooking appliance comprising an open top and bottom shell, a removable top therefor, and a base plate adapted to support said shell to complete an oven structure with said shell and top, said base plate having openings, and register means for controlling said openings.

6. A sectionalized cooking appliance comprising an open top and bottom shell, a top therefor having one or more openings, pots having their body portion adapted to register with and to be inserted through said openings, to project within said shell, and a base plate adapted to support said shell, said base plate having openings, and register means for controlling said openings.

GUIDO M. SACERDOTE.